3,121,121
PERFLUOROPINACOL AND SYNTHESIS THEREOF
Richard V. Lindsey, Hockessin, and William J. Middleton, Wilmington, Del., assignors to E. I. du Pont de Nemours and Company, Wilmington, Del., a corporation of Delaware
No Drawing. Filed Oct. 30, 1961, Ser. No. 148,639
3 Claims. (Cl. 260—633)

This invention relates to, and has as its principal objects provision of, the novel perfluorinated 1,2-glycol perfluoro(2,3-dimethyl-2,3-butanediol),

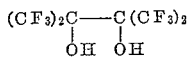

hereinafter referred to by its alternative name, perfluoropinacol, and a process for preparing the same. Like a number of other fluorine compounds, perfluoropinacol is toxic and should be handled with care.

According to the present invention, perfluoropinacol is prepared by bimolecular reduction of hexafluoroacetone in the presence of an alcohol having hydrogen on the carbinol carbon under the influence of light energy in the wavelength range of about 1000–7000 Angstrom units and under substantially anhydrous conditions. The reaction which takes place may be represented by the following equation, isopropyl alcohol serving as the illustrative hydrogen donor:

$2CF_3-CO-CF_3 + CH_3-CHOH-CH_3 \longrightarrow$

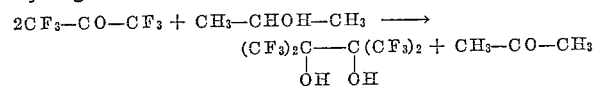

The process is conducted by exposing an intimate mixture of hexafluoroacetone and a primary or secondary alcohol to a source of radiant light energy until at least an appreciable amount of perfluoropinacol has formed. Any substantially anhydrous alcohol is suitable as the hydrogen donor. Examples of such alcohols are methyl, ethyl, propyl, isopropyl, n-butyl, sec.-butyl, isobutyl, n-amyl alcohols, 1-heptanol, 2-octanol, diethylcarbinol, diisopropylcarbinol, allyl alcohol, propargyl alcohol, geraniol, citronellol, cyclohexanol, benzyl alcohol, phenylethyl alcohol, etc. It will be noted that these are monohydric alcohols consisting solely of carbon and hydrogen except for the hydroxyl group. For reasons of economy and effectiveness, alkanols having from 1 to 10 carbon atoms are preferred. Isopropyl alcohol is an especially efficient source of hydrogen. Other hydrogen donors containing non-alcoholic hydroxyl groups can be used, such as formic acid, but with generally less satisfactory results.

The relative proportions of the reactants are not critical, in the sense that they do not influence the course of the reaction. For more complete utilization of the hexafluoroacetone, it is desirable, but not essential, to use the alcohol in at least stoichiometric amounts, i.e., in amounts of at least one-half mole per mole of hexafluoroacetone. Preferably, the alcohol is used in amounts of at least one mole per mole of hexafluoroacetone. A large excess of alcohol can be used if desired.

Any light source emitting radiation in the range of about 1000–7000 A. is suitable for the photochemical reduction of hexafluoroacetone. Ordinary sunlight is satisfactory but rather slow in its effect, and it is more convenient to use light richer in radiation in the ultraviolet range, especially light in the wavelength range from about 1800 A. (the lower limit of transmission of quartz) to about 4000 A. Suitable light sources are the mercury vapor arc, tungsten bulbs of suitable intensity, or commercial sun lamps.

Other operating conditions are not critical. Thus, the reaction can take place at low temperature, e.g., −50° C. or even lower. As a matter of convenience, it is preferred to operate at or in the neighborhood of ordinary temperature, i.e., in the range from 0 to 50° C., but elevated temperatures can also be used, although there is no advantage in exceeding about 100° C. Even though hexafluoroacetone is a gas boiling at about −28° C., the reaction can be conducted in an open vessel, with or without a reflux condenser, since hexafluoroacetone forms high boiling mixtures with most alcohols, through an equilibrium reaction producing a hemiketal. The reaction can also be conducted in closed vessels under the autogenous pressure developed by the reactants and reaction products.

The process can be carried out by mixing together the total amounts of the two reactants initially and irradiating the mixture. Alternatively, one or the other reactant or a preformed mixture of both can be introduced gradually into the irradiated reaction vessel, if desired while periodically withdrawing a portion of the reaction mixture, recovering the unchanged reactants from this portion and recycling them, thus making the operation continuous or semi-continuous.

The reaction time depends on such factors as the intensity of the irradiation, the reactivity of the hydrogen donor and the amount of hexafluoroacetone it is desired to convert. Substantial conversions are usually realized after a few hours, but nearly complete utilization of the hexafluoroacetone may require irradiation for longer periods, for example of the order of one hundred hours.

Perfluoropinacol forms addition complexes with many of the alcohols used as hydrogen donors and with the ketone by-products. These adducts are, however, easily broken by treatment with a strong, non-volatile acid such as sulfuric or phosphoric acid. Recovery of the perfluoropinacol, which boils at 129° C. at atmospheric pressure, is effected most conveniently by distillation from the acidic mixture, with or without preliminary fractionation.

The following example illustrates the invention in greater detail.

*Example*

A mixture of 88 g. (0.53 mole; 50 ml. measured at −78° C.) of hexafluoroacetone and 40 g. (0.66 mole) of isopropyl alcohol was placed in a quartz flask. The flask was irradiated at ambient temperature for 96 hours, the light source being a low pressure mercury resonance lamp emitting light of 2537 A. wavelength, after which the reaction mixture was fractionated. The fraction boiling between 130 and 160° C. was redistilled from an equal volume of concentrated sulfuric acid to give 55.4 g. (63% yield) of perfluoropinacol as a colorless liquid boiling at 129° C., which solidified on cooling to a solid melting at 26° C.

*Analysis.*—Calcd. for $C_6H_2F_{12}O_2$: C, 21.57; H, 0.61; F, 68.25; mol. wt., 334. Found: C, 22.12; H, 0.98; F, 67.89; mol. wt. (neutralization equivalent), 336.

The identity of the product was confirmed by the nuclear magnetic resonance fluorine and proton spectra, both exhibiting a single unsplit resonance band, and by the infrared spectrum, showing a strong band at 2.85μ for OH in the pure liquid and at 2.82μ for OH in 0.05 M carbon tetrachloride solution. Perfluoropinacol is strongly acidic (pKa 5.95) and titratable with bases.

When the above-described procedure was repeated except that the isopropyl alcohol was replaced with formic acid in the same molar ratio, perfluoropinacol was again obtained but the yield was only 20% of the theory.

Perfluoropinacol is miscible with water in all proportions. The freezing point of water is depressed by addition of perfluoropinacol, which is therefore suitable for use as an antifreeze. In this use, it has the advantage that, as the mixture freezes, it contracts rather than expands as does pure water, and therefore does not crack or distort the vessel containing it.

Perfluoropinacol has excellent thermal stability, as shown by the fact that, after being heated for 5 hours at 250° C. in a sealed vessel, it is recovered unchanged, as determined by its nuclear magnetic resonance spectrum. It is therefore eminently stable as a heat transfer medium, for example as a transformer fluid.

Another use for perfluoropinacol results from its ability to form readily at room temperature adducts with ethers, alcohols and ketones. For example, it forms with dioxane a well crystallized 1:1 molar adduct, obtained as colorless needles melting at 79–81° C. Thus, perfluoropinacol can be used to detect ethers, alcohols or ketones in mixtures containing them or to remove these substances when they are present as contaminants, for example from hydrocarbons. In view of its acidic nature, it can also be used similarly to remove and separate amines from other components.

Perfluoropinacol has further been found to be an excellent solvent at ordinary or moderately high temperatures for a number of high molecular weight synthetic polymers such as the polyamides generically known as nylons, the polyesters, polyvinyl alcohol, etc., including relatively intractable polymers such as the high molecular weight formaldehyde polymers. As an illustrative application of this property, perfluoropinacol can be used to solvent-weld pipes and other articles made of such polymers.

Since obvious modifications and equivalents in the invention will be evident to those skilled in the chemical arts, we propose to be bound solely by the appended claims.

The embodiments of the invention in which an exclusive property or privilege is claimed are defined as follows:

1. Perfluoropinacol.
2. The process of preparing perfluoropinacol which comprises reducing hexafluoroacetone in the presence of a monohydric alcohol consisting solely of carbon and hydrogen except for the hydroxyl and having hydrogen on the carbinol carbon under the influence of light energy in the wavelength range of about 1000–7000 A. and under substantially anhydrous conditions.
3. The process of claim 2 wherein the alcohol is isopropyl alcohol.

References Cited in the file of this patent

Simons: "Fluorine Chemistry," Academic Press Inc., N.Y., vol. II (1954), page 232.